United States Patent
Mizuno

(10) Patent No.: US 7,172,830 B2
(45) Date of Patent: Feb. 6, 2007

(54) SEPARATOR FOR FUEL CELL AND MANUFACTURING METHOD FOR THE SAME

(75) Inventor: Seiji Mizuno, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/232,498

(22) Filed: Jan. 15, 1999

(65) Prior Publication Data

US 2002/0004156 A1    Jan. 10, 2002

(30) Foreign Application Priority Data

Jan. 19, 1998   (JP)   ................................. 10-022752

(51) Int. Cl.
*H01M 8/02*   (2006.01)

(52) U.S. Cl. ..................... 429/34; 204/255; 264/29.5

(58) Field of Classification Search ................ 429/249, 429/12, 34, 38; 204/255; 264/29.5

See application file for complete search history.

(56) References Cited

U.S. PATENT DOCUMENTS

| | | | |
|---|---|---|---|
| 3,634,569 A | | 1/1972 | Emanuelson et al. |
| 4,197,178 A | * | 4/1980 | Pellegri ..................... 204/255 |
| 4,466,932 A | | 8/1984 | Koyama et al. |
| 4,582,632 A | | 4/1986 | Rokujo et al. |
| 4,592,968 A | * | 6/1986 | Taylor ......................... 429/34 |
| 4,643,956 A | * | 2/1987 | Sandelli ....................... 429/34 |
| 4,802,896 A | | 2/1989 | Law et al. |
| 4,956,131 A | * | 9/1990 | Shigeta ....................... 264/29.5 |
| 5,066,735 A | * | 11/1991 | Walker et al. ............... 525/482 |
| 5,371,152 A | | 12/1994 | Hoyano et al. |
| 5,648,027 A | * | 7/1997 | Tajiri et al. ................... 264/43 |

FOREIGN PATENT DOCUMENTS

| | | |
|---|---|---|
| EP | 0 78 43 52 | 7/1997 |
| JP | 01-057467 B2 | 3/1984 |
| JP | 59-42781 A | 3/1984 |
| JP | 60-246568 | 12/1985 |
| JP | 62-046504 | 2/1987 |
| JP | 62-160661 | 7/1987 |
| JP | 63-184264 | 7/1988 |

(Continued)

OTHER PUBLICATIONS

Patent Abstracts of Japan, vol. 008, No. 131 (E-251), Jun. 19, 1984 & JP 59 042781 A (Toukai Carbon KK), Mar. 9, 1984 & Database WPI Section Ch, Week 8416 Derwent Publications Ltd., London, GB; AN 84-0097589 XP002105100 & JP 59 042781 A (Tokai Carbon KK), Mar. 9, 1984.

(Continued)

*Primary Examiner*—Mark Ruthkosky
(74) *Attorney, Agent, or Firm*—Kenyon & Kenyon LLP

(57) ABSTRACT

A separator for a fuel cell is manufactured by preparing a raw material powder, uniformly mixing the prepared raw material to be formed into a slurry, and charging the raw material powder derived from granulation into a metal mold for heat press forming. The raw material is obtained by adding to carbon powder a binder containing a mixture of phenolic resin and epoxy resin. Therefore the heat press forming step does not cause the binder to generate gas, thus allowing manufacturing of a separator exhibiting sufficient gas-impermeability.

2 Claims, 8 Drawing Sheets

FOREIGN PATENT DOCUMENTS

| | | |
|---|---|---|
| JP | 04-284363 | 10/1992 |
| JP | 04-294053 | 10/1992 |
| JP | 05-032865 | 2/1993 |
| JP | 08-151461 * | 6/1996 |
| JP | 08-222241 | 8/1996 |
| JP | 10-003931 A | 1/1998 |
| WO | WO 9919389 | 4/1999 |

OTHER PUBLICATIONS

Patent Abstracts of Japan, vol. 012, No. 158 (E-608), May 13, 1988 & JP 62 272465 A (Hitachi Chem. Co. Ltd.), Nov. 26, 1987.

Patent Abstracts of Japan, vol. 098, No. 005, Apr. 30, 1998 & JP 10 003931 A (Toyota Motor Corp.), Jan. 6, 1998 & Chemical Abstracts, vol. 128 No. 8, Feb. 23, 1998, Columbus, Ohio, US; abstract No. 91068; Yoshimura, Tsuneharu, et al.: "Separators for Fuel Cells and their Manufacture", XP002110012.

Patent Abstracts of Japan, vol. 010, No. 108 ( E-398), Apr. 23, 1986 & JP 60 246568 A (Fuji Denki Sougou Kenkyusho:KK; Others: 01), Dec. 6, 1985.

Patent Abstracts of Japan, vol. 009, No. 126 (E-318), May 31, 1985 & JP 60 12672 A (Hitachi Kasei Kogyo KK) , Jan. 23, 1985.

Japanese Language Version of Japanese Office Action, Appln. No. 10-022752, issued Jan. 10, 2006.

English Translation of Remarks from the Examiner for Japanese Office Action, Appln. No. 10-022752, issued Jan. 10, 2006.

* cited by examiner

SEPARATOR FOR FUEL CELL AND MANUFACTURING METHOD FOR THE SAME

INCORPORATION BY REFERENCE

The disclosure of Japanese Patent Application No. HEI 10-22752 filed on Jan. 19, 1998 including the specification, drawings and abstract is incorporated herein by reference in its entirety.

BACKGROUND OF THE INVENTION

1. Field of the Invention

The present invention relates to a separator for a fuel cell and a method of manufacturing the separator. More specifically, in a fuel cell formed of a plurality of stacked unit cells, the present invention relates to a separator disposed between adjacent unit cells for forming a fuel gas passage and an oxide gas passage, by which fuel gas and oxide gas can be separated. The present invention further relates to a method of manufacturing the separator.

2. Description of the Related Art

As a method of a separator for a fuel cell, there is a known method described in Japanese Patent Application Laid-open No. HEI 8-222241 in which phenolic resin is added as a binder to carbon powder as a raw material for kneading and forming, which is baked for carbonization and graphitization. When the separator is manufactured in the aforementioned method, a block-shaped carbon member is prepared by the aforementioned baking step, the carbon member is machined and cut into a plate-like member such that a separator having a desired shape is obtained. As another method of manufacturing the separator, Japanese Patent Application Laid-open No. SHO 60-246568 discloses a method in which phenolic resin as a binder is mixed into carbon powder, and the mixture is subjected to a heat press forming at a temperature at which the resin is not graphitized. In the aforementioned method, the separator with a desired shape can be obtained by conducting the heat press process using a metal mold with a predetermined shape.

However, the former method includes the baking step for heating at a high temperature ranging from 1,000 to 3,000° C., and the step for machining the baked carbon. This may elongate the time required for manufacturing and further complicate the manufacturing process, resulting in increased manufacturing cost. Further, phenolic resin added to the carbon powder as the binder generates water during the baking step, which forms bubbles in the carbon members that have been baked. As a result, the gas-impermeability of the separator is deteriorated. In order to secure gas-impermeability of the separator, it is necessary to eliminate the bubbles generated in the carbon member. This may further complicate the manufacturing process.

Meanwhile the latter method does not include the baking step and the machining step, resulting in simplified manufacturing process compared with the former method. However in the heat press step, when the phenolic resin as a thermosetting resin is cured, the hydroxyl group contained therein reacts to generate gas (vapor). Accordingly bubbles are formed in the manufactured separator, resulting in insufficient gas-impermeability of the separator.

SUMMARY OF THE INVENTION

It is an object of the present invention to solve the aforementioned problem, and to provide a separator for a fuel cell having sufficient gas-impermeability using a simple method.

According to the present invention, the aforementioned object can be achieved by a method of manufacturing a separator for a fuel cell including the steps of preparing a raw material by mixing a carbon, an epoxy resin and a phenolic resin; charging the raw material into a predetermined mold; and heat press forming the raw material charged into the mold.

According to the method of manufacturing a separator for a fuel cell, as the epoxy resin is used in addition to the phenolic resin as the binder, no gas is generated by the binder during thermosetting process thereof in the heat resulting from the forming step. This may prevent swelling of the separator obtained by the heat-press forming, thus providing a separator exhibiting sufficient gas-impermeability.

Here, the raw material may contain materials other than the carbon and the binder. For example, hydrophilic material may be added to the raw material such that the manufactured separator exhibits hydrophilic properties. Further, in addition to the phenolic resin and epoxy resin, an accelerator for curing the epoxy resin may be added to the binder.

In the foregoing, when the epoxy resin and the phenolic resin in the binder become thermoset by a thermochemical reaction, the ratio of an amount of epoxy group of the epoxy resin to an amount of hydroxyl group of the phenolic resin may be set to a value ranging from 0.8 to 1.2.

Accordingly the hydroxyl group of the phenolic resin in the binder is allowed to react sufficiently with the epoxy group (three members contained) in the epoxy resin, and gas generated from the phenolic resin during heating can be suppressed. Further, as the amount of epoxy resin is not excessively increased as compared with the amount of phenolic resin, thereby preventing elongation of a time required to thermoset the binder owing to excessive increase in the amount of the epoxy resin.

It is preferable that the carbon is formed as a powder containing scaly natural graphite particles having an average particle size ranging from 5 to 50 m.

The scaly natural graphite particles exhibit a predetermined binding capability during press forming. Therefore the amount of the binder added to the raw material can be reduced by using carbon powder formed of scaly natural graphite particles. Since the thermosetting resin as the binder has no conductivity, the conductivity of the separator can be improved by reducing the amount of binder. If the amount of binder added to the raw material exceeds the predetermined amount, the strength of the resultant separator is likely to be deteriorated at a temperature equal to or higher than the temperature corresponding to the one at which the fuel cell is operated. However, the strength of the separator can be sufficiently secured by reducing the amount of the binder added to the raw material.

Additionally it is preferable to provide the step where one of surfaces of the separator in contact with the fuel cell is eliminated by grinding when it is incorporated in the fuel cell.

The aforementioned structure makes it possible to eliminate the binder layer formed on the separator surface and a mold-separating agent adhered to the separator surface. That is, when subjecting the carbon and the raw material containing a binder formed of a thermosetting resin to heat press forming, the binder melted during the forming process is blurred out to form the binder layer on the separator surface. Further, the mold-separating agent is applied onto the metal mold for press forming so as to enhance the mold-separation to draw the separator from the metal mold (to make it easier to draw the separator from the metal mold). At least a portion of the mold-separating agent will adhere to the surface of the separator drawn from the metal mold. The binder layer or the mold-separating agent adhered onto the separator surface has no conductivity, thus allowing improvement of the conductivity of the separator through grinding treatment.

According to another aspect of the present invention, the separator for a fuel cell includes an aggregation of carbon particles; and a binder containing phenolic resin and epoxy resin, which is charged in a clearance among the carbon particles constituting the aggregation.

Since this separator uses a binder containing epoxy resin and phenolic resin, the phenolic resin generates no gas during the manufacturing steps, resulting in sufficient gas-impermeability.

DESCRIPTION OF THE PREFERRED EMBODIMENT

An embodiment of the present invention will be explained hereinafter.

Figure 3:
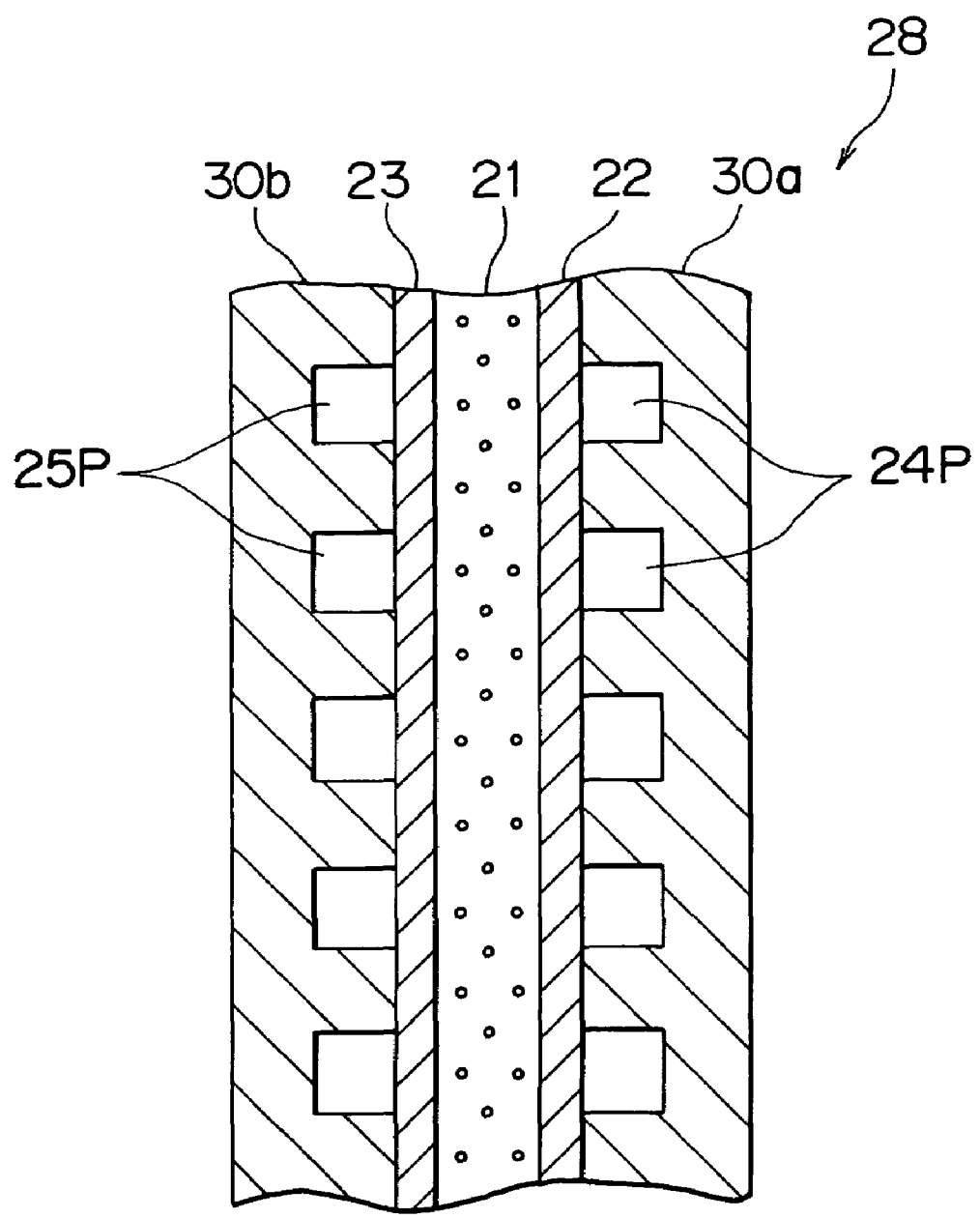
FIG. 3 is a schematic view of a unit cell.
Figure 4:
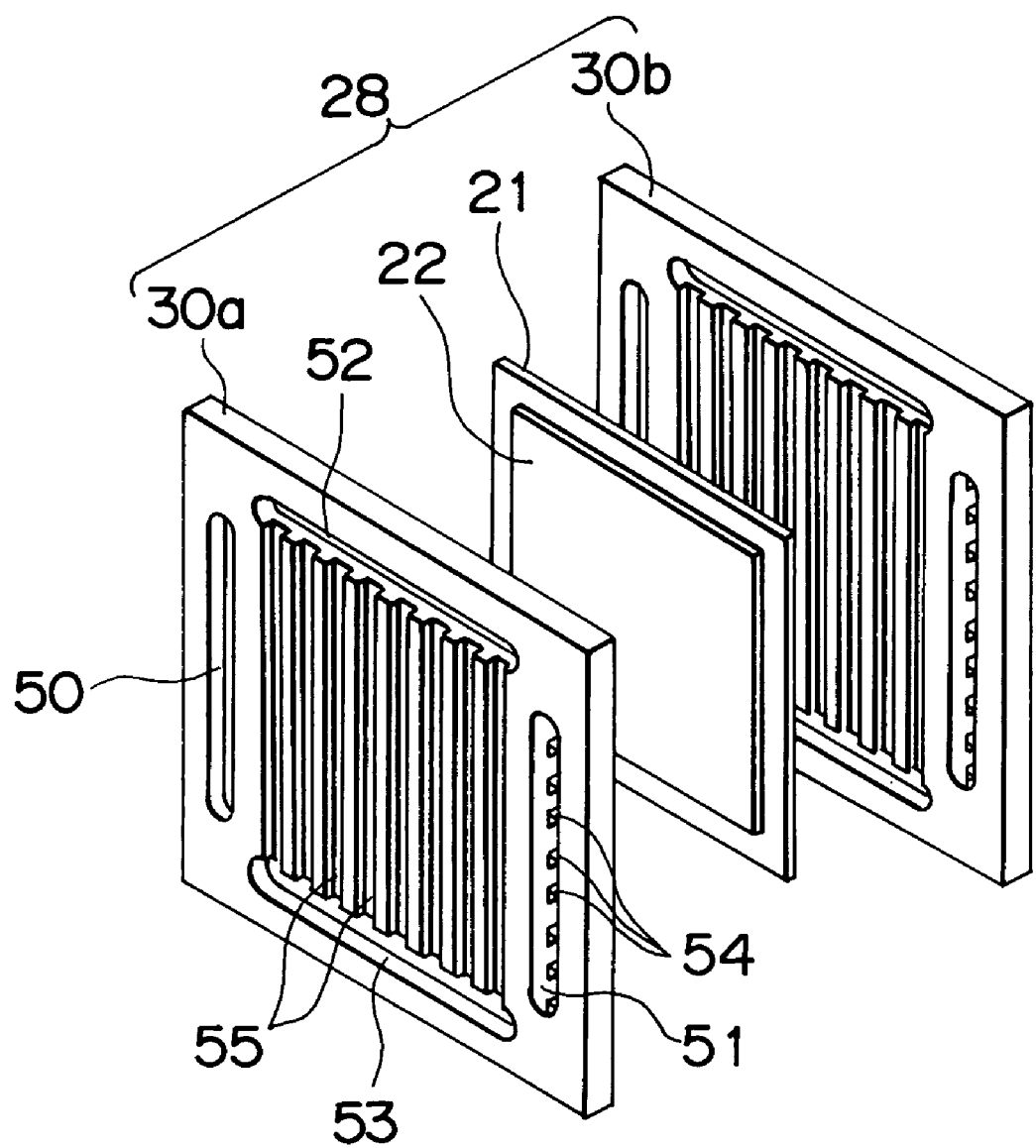
FIG. 4 is an exploded perspective view showing a structure of the fuel cell.
Figure 5:
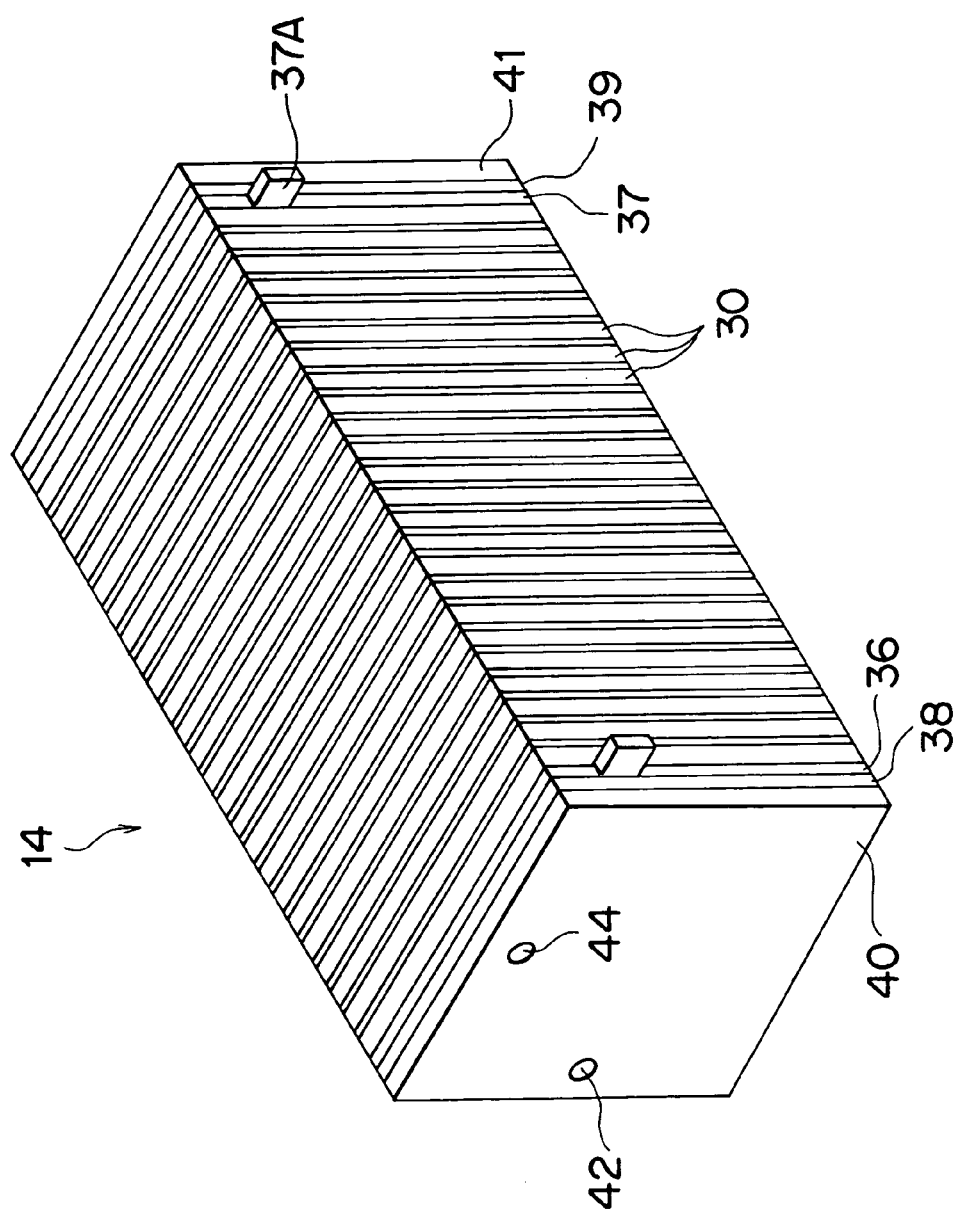
FIG. 5 is a perspective view showing the appearance of a stack structure 14 formed by stacking unit cells of a fuel cell.

A fuel cell having a separator manufactured using a method of manufacturing a separator according to the present invention has a stack structure in which a plurality of unit cells are stacked. FIG. 3 is a schematic view of a unit cell 28 constituting the fuel cell. FIG. 4 is an exploded perspective view showing a structure of the unit cell 28. FIG. 5 is a perspective view showing an appearance of a stack structure 14 formed by stacking the unit cells 28.

The fuel cell of the present embodiment is of a solid polymer type. The solid polymer type fuel cell includes, as an electrolytic layer, a membrane formed of solid polymer exhibiting excellent conductivity in a wet state. The fuel cell receives, at its anode side, fuel gas containing hydrogen, and receives, at its cathode side, oxide gas containing oxygen, such that the following electrochemical reaction takes place:

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Formula (1) represents the reaction at the anode; formula (2) represents the reaction at the cathode; and the reaction represented by formula (3) takes place in the fuel cell. The fuel cell directly converts chemical energy of from fuel supplied thereto into electric energy, which device exhibits extremely high energy efficiency. The unit cell 28 constituting the fuel cell is formed of an electrolytic membrane 21, an anode 22, a cathode 23, and separators 30a, 30b as shown in FIG. 3.

The anode 22 and the cathode 23 are gas diffusion electrodes interposing the electrolytic membrane 21 therebetween to form a sandwich structure. The separators 30a, 30b further interpose the sandwich structure therebetween, while forming passages for fuel gas and oxide gas between the separator 30a and the anode 22, and between the separator 30b and the cathode 23, respectively. Fuel gas passages 24P are formed between the anode 22 and the separator 30a, and oxide gas passages 25P are formed between the cathode 23 and the separator 30b. When the fuel cell is actually assembled, a predetermined number of unit cells 28 are stacked to form a stack structure 14.

Although FIG. 3 shows ribs constituting the gas passages provided only at one side of each of the separators 30a, 30b, in the actual fuel cell, each of the separators 30a, 30b is provided with ribs 54, 55 at both surfaces thereof as shown in FIG. 4. The ribs 54 formed in one surface of each of the separators 30a, 30b constitute the fuel gas passages 24P between the ribs 54 and the adjacent anode 22, and the ribs 55 formed in the other surface of each of the separators 30a, 30b constitute the oxide gas passages 25P between the ribs 55 and the cathode 23 of the adjacent unit cell. Therefore, the gas passages are defined by the separator 30b and the gas diffusion electrode, which serve to separate the flows of fuel gas and oxide gas between the adjacent unit cells. In this manner, in the actually assembled fuel cell, there is no difference between the separators 30a and 30b in view of shape and function. Therefore the separators 30a, 30b will be hereinafter generically called separators 30.

The shape of the ribs 54, 55 formed on the respective surfaces of the respective separators is not restricted as far as the gas passages can be formed to allow supply of fuel gas and oxide gas to the gas diffusion electrodes. In the present embodiment, each group of ribs 54, 55 formed on the separator surfaces has a structure in which a plurality of grooves are formed in parallel. In FIG. 3, in order to schematically show the structure of the unit cell 28, the fuel gas passages 24P and the oxide gas passages 25P are arranged in parallel. However to aid in assembling the fuel cell, the ribs 54, 55 are preferably arranged on opposite surfaces of each of the respective separators 30 such that they cross each other at a right angle.

The electrolytic membrane 21 is an ion exchange membrane of proton conductivity formed of, for example, fluoroplastics, and exhibits excellent conductivity in a wet state. In the present embodiment, Nafion membrane (DuPont) is employed. As a catalyst, platinum or an alloy containing platinum and another metal is applied to the surface of the electrolytic membrane 21.

Each of the anode 22 and the cathode 23 is formed of a carbon cloth woven by carbon fiber thread. In the present embodiment, the anode 22 and the cathode 23 are formed of carbon cloth. However it may be preferable to use carbon paper or carbon felt made of carbon fiber.

The separator 39 is manufactured in accordance with a method to be described later, and is formed as a formed carbon through compression of the carbon material. Four holes are provided around the separator 30, that is, fuel gas holes 50, 51 communicate with the ribs 54 constituting the fuel gas passages 24P, and oxide gas holes 52, 53 communicate with the ribs 55 constituting the oxide gas passages 25P. When the fuel cell is assembled, the fuel gas holes 50, 51 of the separators 30 constitute a fuel gas supply manifold and a fuel gas discharge manifold penetrating through the fuel cell in its stacked direction. Further, the oxide gas holes 52, 53 of the separators 30 constitute an oxide gas supply manifold and an oxide gas discharge manifold penetrating through the fuel cell in its stacked direction.

When the fuel cell having the aforementioned members is assembled, the separator 30, the anode 22, the electrolytic membrane 21, the cathode 23 and the separator 30 are stacked in the above order. Collector plates 36, 37, insulation plates 38, 39, and end plates 40, 41 are further disposed on opposite sides to interpose the stacked body in the above order so as to provide the stack structure 14 as shown in FIG. 5. The collector plates 36, 37 are provided with output terminals 36A, 37A, respectively for outputting electromotive force generated in the fuel cell.

The end plate 40 has two hole structures as shown in FIG. 5, one is a fuel gas hole 42, and the other is an oxide gas hole 44. The insulation plate 38 and the collector plate 36 adjacent to the end plate 40 also have two holes at locations corresponding to the two holes of the end plate 40. The fuel gas hole 42 is opened to a central portion of the fuel gas hole 50. When the fuel cell is operated, the fuel gas hole 42 is connected to a fuel supply device which is not shown, and fuel gas having a large amount of hydrogen is supplied to the fuel cell. Similarly, the oxide gas hole 44 is formed at a position corresponding to the central portion of the oxide gas hole 52 of the separator 30. When the fuel cell is operated, the oxide gas hole 44 is connected to the oxide gas supply device, and the oxide gas containing oxygen is supplied to the fuel cell. Here, the fuel gas supply device and the oxide gas supply device serve to respectively humidify and pressurize fuel gas and oxide gas to a predetermined level for supply to the fuel cell.

The end plate 41 includes two holes at positions different from those of the end plate 40. Likewise the end plate 41, the insulation plate 39 and the collector plate 37 include two holes at the same positions. A fuel gas hole 43 as one of two holes of the end plate 41 is opened to a position corresponding to the central portion of the fuel gas hole 51 of the separator 30. An oxide gas hole 45 as the other one is opened to a position corresponding to the central portion of the oxide gas hole 53 of the separator 30. When operating the fuel cell, a fuel gas discharge device (not shown) is connected to the fuel gas hole 43, and an oxide gas discharge device (not shown) is connected to the oxide gas hole 45.

The stack structure 14 having the above-described various members is held in a state where a predetermined compressing force is applied in the stacked direction, by which the fuel cell is completed. Illustration of the structure for compressing the stack structure 14 is omitted.

Next, flow of the fuel gas and oxide gas in the fuel cell with the aforementioned structure will be explained. Fuel gas is introduced into the fuel cell from the predetermined fuel gas supply device through the fuel gas hole 42 formed in the end plate 40. Fuel gas in the fuel cell is supplied to the fuel gas passage 24P of each of the unit cells 28 through the fuel gas supply manifold, which is subjected to electrochemical reaction which progresses at the cathode side of each unit cell 28. Fuel gas discharged from the fuel gas passage 24P is collected to the fuel gas discharge manifold and reaches the fuel gas hole 43 of the end plate 41, discharged through the fuel gas hole 43 to the outside of the fuel cell, and is guided to the predetermined fuel gas discharge device.

Similarly, the oxide gas is introduced into the fuel cell from the predetermined oxide gas supply device through the oxide gas hole 44 formed in the end plate 40. The oxide gas in the fuel cell is supplied to the oxide gas passage 25P of each of the unit cells 28 through the oxide gas supply manifold, and is subjected to electrochemical reaction which progresses at the anode side of each unit cell 28. The oxide gas discharged from the oxide gas passages 25P is collected to the oxide gas discharge manifold and reaches the oxide gas hole 45 of the end plate 41, and is discharged through the oxide gas hole 45 to the predetermined oxide gas discharge device.

Figure 1:
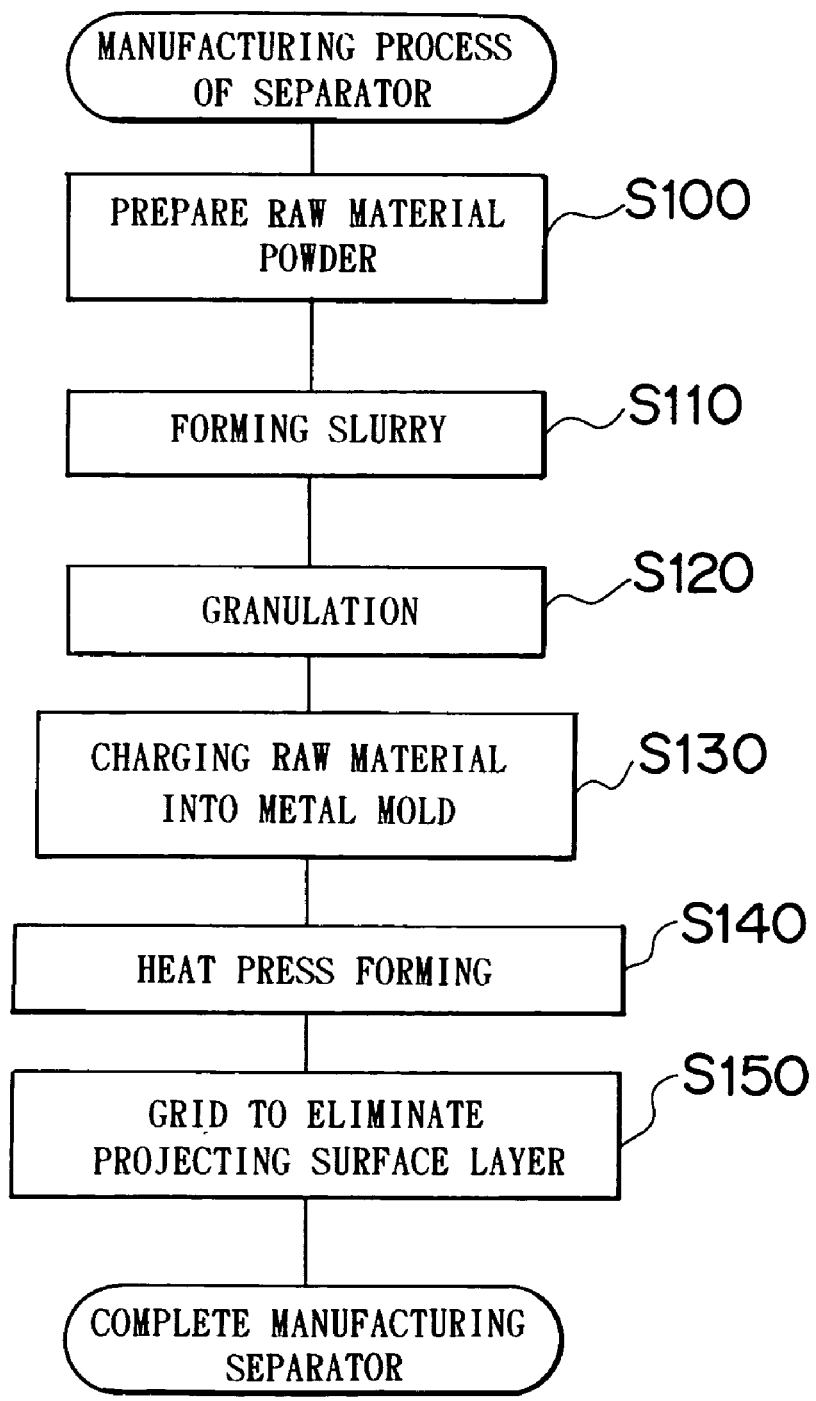
FIG. 1 is a flowchart showing a method of manufacturing a separator for a fuel cell according to an embodiment of the present invention.
Figure 2A:
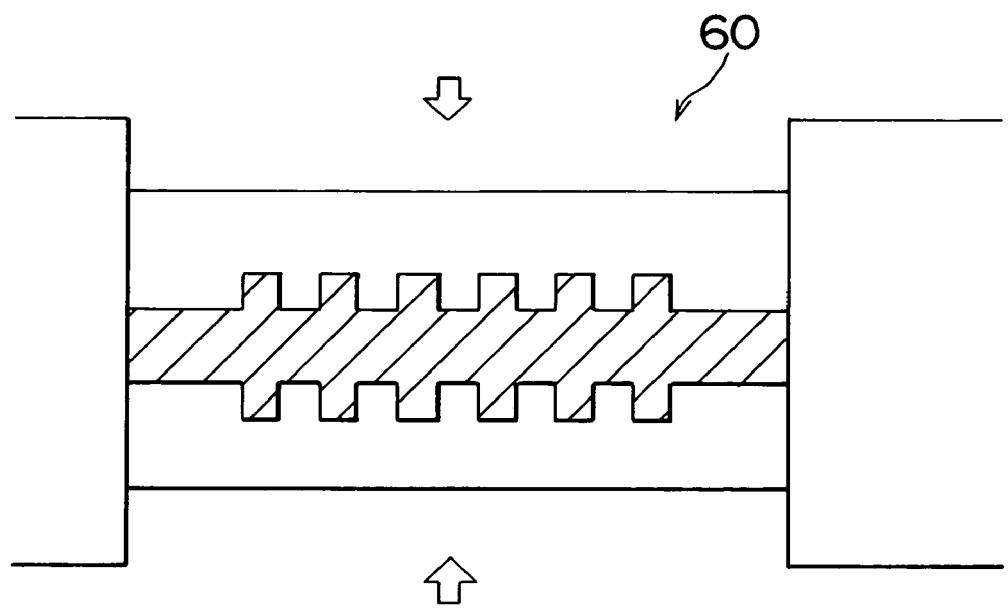
FIGS. 2A and 2B are diagrams showing how the separator is manufactured through pressure formation.
Figure 2B:
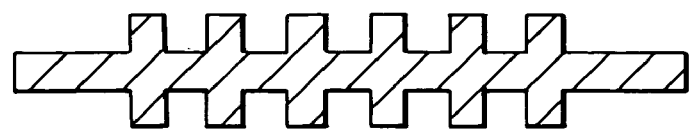

The method of the separator 30 will now be explained. FIG. 1 is a flowchart showing the method of manufacturing the separator 30 of the present invention, and FIGS. 2A and 2B are diagrams showing the press forming steps of FIG. 1. In the manufacturing steps of the separator 30 shown in FIG. 1, the separator 30 is formed by heating and pressing the raw material powder prepared by adding binder to carbon powder. In the present embodiment, as the binder to be added to the raw material powder, a cresol novolac type epoxy resin and a novolac type phenolic resin are used.

First, the method of manufacturing the separator 30 will be explained referring to FIG. 1. The raw material powder is prepared to manufacture the separator 30 (step S100). Here, carbon powder as the raw material and the binder to be bound to the carbon powder for giving sufficient strength to the separator are prepared.

Generally, the binder is formed of a thermosetting resin which causes a thermosetting reaction when it is heated to a predetermined temperature. Preferably the binder used for manufacturing the separator is stable with respect to the driving temperature of the fuel cell and the respective components of gas supplied to the fuel cell. In the present embodiment, the cresol novolac type epoxy resin and the novolac type phenolic resin are used to form the thermosetting resin as the binder. The binder prepared in step S100 is composed of the same amounts of the cresol novolac type epoxy resin containing epoxy with an equivalent weight of 214 g and the novolac type phenolic resin containing OH with an equivalent weight of 103 g. Imidazole compound is further added to the epoxy resin by the ratio of 0.5% as a curing accelerator of the epoxy resin. The ratio may be variable from about 0.1% to about 1.0% according to the forming condition. In step S100, the binder containing such components is prepared in an amount equal to approximately 12% of that of the carbon powder. The amount may be variable from about 8% to about 16% according to a kind of the carbon.

In the present embodiment, scaly natural graphite was used as the carbon powder. The scaly natural graphite used had an average particle diameter ranging from 5 to 50 μm and a particle size distribution ranging from 1 to 200 μm. If the particle size of the carbon powder is small, a larger amount of the binder may be required for the heat press forming to be described later. Meanwhile if the particle size of the carbon powder is large, it is difficult to mix the carbon powder with the binder sufficiently and uniformly. In view of the foregoing conditions, a carbon powder with the particle size within the above range was used.

Next, methyl ethyl ketone (MEK) as the organic solvent was added to the raw material prepared in step S100, which was uniformly mixed by a ball mill to prepare a slurry with a viscosity of 200 cps (step S110). Then, a spray dryer is filled with the slurry, which is subjected to a spray dry treatment at 80° C. to obtain powder having average particle size of about 100 μm (step S120). The viscosity of the slurry prepared in step S110 may be adjusted appropriately such that particles with the aforementioned desired particle size can be obtained in consideration of the performance of the spray dryer used in step S120.

Although the slurry prepared by mixing the carbon powder and the binder is granulated using the spray dryer in step S120, powder produced by mixing the carbon and binder may be prepared. For example, the slurry may be dried and then crushed. If the raw material powder can be uniformly mixed, a dry type kneading for mixing the raw material powder without using solvent may be conducted at a temperature at which the resin is not cured (higher than the room temperature by 100° C.) in place of wet type kneading.

The carbon used as the raw material may be formed into a shape that can be mixed with the binder uniformly to an allowable level using the aforementioned wet or dry kneading. In the present invention, in order to mix the carbon with the binder uniformly to obtain the particle size specified in step S120, scaly natural graphite powder composed of particles within the aforementioned size range is used.

In step S120, powder formed of particles containing carbon powder and binder is prepared and then, charged into a metal mold having a predetermined shape (step S130). FIG. 2A schematically shows the raw material powder charged into the metal mold 60. The metal mold 60 has recessed portions and projecting portions at its inner surface, which allows formation of a separator 30 having a shape as shown in FIG. 4 by press forming the raw material powder using the metal mold 60. By pressing the powder under a surface pressure of 1 ton/cm$_2$ at 180° C., a separator member having the same shape as that of the separator 30 shown in FIG. 4 can be obtained (step S140). The surface pressure at the time of pressing may be set to a different value as far as the manufactured separator 30 exhibits sufficient strength. An amount of the binder mixed with the carbon powder as the raw material can be adjusted in accordance with the selected surface pressure.

During press forming in step S140, the thermosetting resin formed as the binder is softened once by heating the metal mold at 180° C. and a thermosetting reaction is generated. Therefore a predetermined strength is given to the separator member simultaneously with the press forming process. Here, heating condition during press forming may be sufficient as far as the aforementioned softening of the resin and the thermosetting reaction can be generated, for example, it can be appropriately determined within temperature ranges from 140 to 220° C. and a heating time from 1 to 30 minutes. Alternatively, after heat press forming in a temperature range and a time at which the thermosetting resin is softened but not fully cured, the formed separator member may be heated at the temperature from 140 to 220° C. for 30 to 600 minutes in a predetermined heating furnace, thereby heat curing the thermosetting resin. In this case, it is possible to obtain sufficient adhering properties by softening the thermosetting resin during press forming to disperse the thermosetting resin in the carbon powder. Further as it is unnecessary to complete the thermosetting reaction during pressing, the time taken for pressing can be shortened, and since the thermosetting reaction can be conducted intensively in the latter step, it is advantageous to manufacture a large amount of separators. Heating temperature and heating time for thermosetting reaction are set such that a selected thermosetting resin can be cured and constituent material of the thermoset resin is not deteriorated.

When the aforementioned press forming is carried out with air left in the metal mold to be mixed in the raw material powder for pressing, the air may remain in the formed separator member, resulting in bubbles formed in the separator member. In order to prevent undesirable bubbles from being formed locally in this manner, the metal mold is evacuated to a pressure equal to or lower than 10 torr at the time of press forming to prevent the air from remaining in the separator member.

Next, in the separator member obtained by the heat-press forming, a surface layer having recessed and projecting portions (ribs 54, 55) for forming gas passages when the separator is incorporated in the fuel cell is removed by grinding (step S150). If the heat press forming is carried out in step S140, when the thermosetting resin is heated and once softened, a portion of the thermosetting resin is blurred from the surface of the separator member, and a layer of thermosetting resin is formed on the surface of the obtained separator member. Since the thermosetting resin has no conductivity, if such a layer of thermosetting resin is formed on the surface, resistance is produced in the manufactured separator member and a layer of thermosetting resin is formed on the surface of the obtained separator member. Since the thermosetting resin has no conductivity, if such a layer of thermosetting resin is formed on the surface, resistance may be created in the manufactured separator member, and a layer of thermosetting resin formed on the portion of the surface at which there is contact between the separator and the member adjacent thereto (gas diffusion electrode) causes a problem. Therefore, a region corresponding to the contact portion, i.e., the surface of projecting portion of the rugged structure formed on the separator member surface is cut for elimination. In the present embodiment, the projecting surface with a height of about 10 μm is eliminated through a grinding process. In the foregoing manner, the thermosetting resin layer formed on the separator member surface is eliminated to complete the separator 30.

If the projecting surface of the structure with recessed and projecting portions formed on the separator member surface is removed through grinding in step S150, the thermosetting resin layer formed on the separator member surface in the course of blur of the thermosetting resin is eliminated as well as the mold-separating agent adhered to the separator member surface at the position where grinding is conducted. The thermosetting resin as the binder added to the raw material exhibits a high degree of adhesion. In order to enhance the force for separating the mold when drawing the separator member from the metal mold used for heat press forming thereafter, the mold-separating agent is applied to the metal mold prior to the heat press forming. As the mold-separating agent, polytetrafluoroethylene (Teflon) is used in the present embodiment. But at least a portion of the mold-separating agent applied to the metal mold will adhere to the separator member when it is drawn from the metal mold. The mold-separating agent adhered to the separator member can be removed from the surface that may be in contact with the gas diffusion electrode by conducting the grinding process in step S150.

The density of the thus formed separator 30 was measured and compared with a theoretical density value. As a result, the density of the separator 30 measured 95% or more of the theoretical density, exhibiting sufficient gas-impermeability as a separator for a fuel cell. Here, the theoretical density is represented by the value which is obtained by virtual calculation to derive the average density from densities of the carbon powder and the binder used as the raw material, and the mixture ratio thereof on the assumption that the separator has been formed with a completely dense structure. In the case of actual manufacturing of the separator, the separator cannot be formed with a completely dense structure. However as the density of the manufactured separator approaches the theoretical density value, the separator will become more dense, resulting in improved gas-impermeability. It is preferable that the actual density of the manufactured separator assumes 93% or more of the aforementioned theoretical density such that gas-impermeability thereof is sufficient to serve as a separator of a fuel cell.

Figure 6:
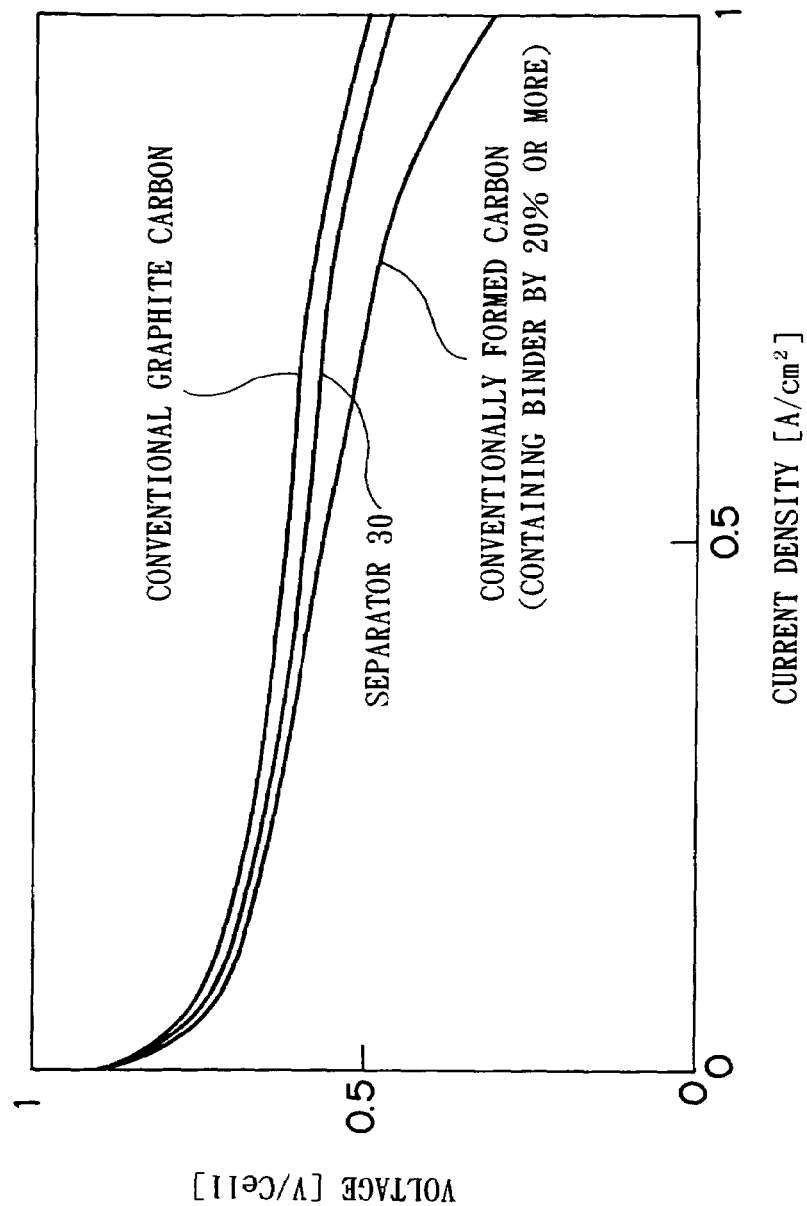
FIG. 6 is a view showing current-voltage characteristics of a fuel cell assembled using the separator.

Referring to FIG. 6, the fuel cell was assembled using the above-manufactured separator 30, and a current-voltage characteristic was measured. FIG. 6 shows current-voltage characteristics of comparative examples. That is, the fuel cell using a separator made of graphite carbon and a fuel cell made of formed carbon. Here, the separator made of graphite carbon of the comparative example is formed by kneading carbon powder and phenolic resin into a predetermined shape, which is baked for graphitization and then subjected to machining into a predetermined shape. As described above, bubbles may be formed in the baked carbon due to gas or vapor generated in the baking step. Therefore, in the separator made of graphite carbon as the comparative example, resin is impregnated subsequent to the baking step to take up bubbles to secure gas-impermeability of the separator. Further, the separator made of formed carbon of the comparative example was manufactured by adding a sufficient amount of the binder formed of the phenolic resin to carbon powder to be kneaded and by subjecting the kneaded substance to the heat press process. Here, in order to secure the gas-impermeability of the separator, the binder with a ratio of 20% or more of the carbon powder was added thereto.

As shown in FIG. 6, the fuel cell assembled using the separator 30 of the present embodiment showed the current-voltage characteristics substantially equal to those of the fuel cells of the comparative examples, and showed excellent cell characteristics as compared with the conventionally known fuel cell assembled using the separator made of carbon.

That is, although the output current value was increased, sufficiently high output voltage could be maintained. The cell characteristics of the fuel cell assembled using the separator as the comparative example is inferior to the fuel cell using the separator of the present invention. This is because during the heat press process, the binder melted in the heat of the molded separator surface is blurred to form the binder layer on the separator surface. Since the binder made of phenolic resin exhibits no conductivity, if the fuel cell is assembled using the aforementioned separator, the internal resistance of the fuel cell is increased, and it is difficult to sufficiently secure sufficient output voltage when the output current assumes a great value.

According to the method of a separator of the present embodiment as described above, since the phenolic resin and the epoxy resin are mixed to form the binder added to carbon powder, when the thermosetting resin used as the binder chemically reacts to become thermoset during the heat-press forming, gas (vapor) is never generated from these resins. Therefore, no swelling nor crack is generated in the separator owing to gas generated during heating, thus manufacturing the separator exhibiting sufficient strength.

Figure 9:
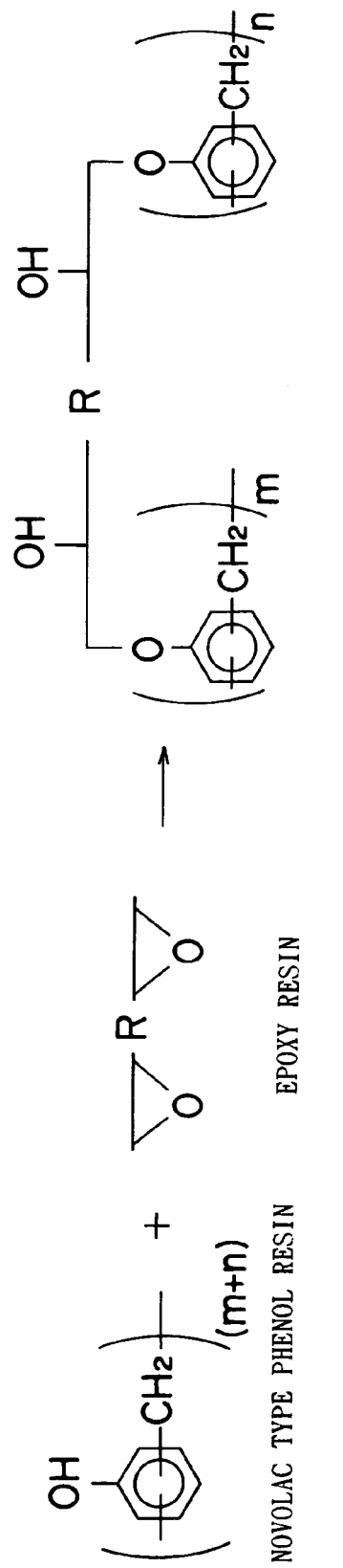
FIG. 9 is a view representing reaction between the epoxy resin and the phenolic resin.

Phenolic resin and epoxy resin are chemically reacted with each other during the heat-press forming, which causes cross-linking between molecules for thermosetting. FIG. 9 illustrates the aforementioned reaction. When only phenolic resin is used as the binder, hydroxyl group contained therein reacts to generate water. In such a case, heating is sharply carried out during press forming. If reaction among hydroxyl groups rapidly progresses, the separator member to be obtained by press forming might be swelled due to vapor that has been rapidly generated. Meanwhile when using both phenolic resin and epoxy resin as the binder, the hydroxyl group of the phenolic resin reacts with epoxy group of the epoxy resin, which generates no vapor.

In order to effectively suppress generation of vapor during heat-press forming by using the binder containing the phenolic resin and the epoxy resin, the epoxy resin has to contain sufficient amount of epoxy group to be reacted with the hydroxyl group such that the hydroxyl group of the phenolic resin generates no undesirable vapor. For example, when using equal amounts of the epoxy resin and phenolic resin, the epoxy resin having epoxy equivalent ranging from 100 to 250 g is mixed with the phenolic resin having OH equivalent ranging from 100 to 120 g. When the epoxy resin and the phenolic resin contained in the binder are heated to chemically react for thermosetting, the ratio of the amount of epoxy group to be chemically reacted in the epoxy resin to the amount of hydroxyl group to be chemically reacted in the phenolic resin is set to the value ranging from 0.8 to 1.2. Accordingly the amount of the epoxy resin and the amount of the phenolic resin can be balanced. Generally the epoxy resin requires thermosetting time longer than the phenolic resin. By balancing amounts of the epoxy resin and the phenolic resin, elongation of the manufacturing time can be prevented while suppressing generation of gas. The amount of epoxy resin may be set to be greater than that of the phenolic resin as far as the manufacturing time is in the allowable range.

In the present invention, the cresol novolac type epoxy resin is used as the epoxy resin, and the novolac type phenolic resin is used as the phenolic resin to be contained in the binder. Different kinds of resins can be used as the epoxy resin and the phenolic resin, respectively. For example, as the epoxy resin, glycidylamine type epoxy resin or bisphenol A type epoxy resin may be used in addition to the cresol novolac type epoxy resin. As the phenolic resin, resol type phenolic resin may be used in addition to the novolac type phenolic resin. In any case, combination of the epoxy resin and the phenolic resin is used, it is possible to obtain the effect to suppress the amount of gas generated during the heating step.

As the property of the manufactured separator varies depending upon the kind of resin in use, appropriate kind of resin can be selected in accordance with the desired property or performance of the separator to be manufactured. For example, heat-resistance of the separator can be improved by using cresol novolac type epoxy resin as the epoxy resin. Meanwhile the separator can be softened so as to be prevented from being too hardened, thus suppressing brittleness and fragility by using the bisphenol A type epoxy resin used as the epoxy resin. Alternatively if combination of the cresol novolac type epoxy resin and the bisphenol A type epoxy resin is used as the epoxy resin, it is possible to provide the separator with advantages of both resins in accordance with the mixture ratio.

According to the method of a separator for a fuel cell of the present embodiment, a separator member is manufactured by heat-press forming without conducting baking step, thus eliminating the machining step for cutting out the baked body into a predetermined shape. Therefore manufacturing steps can be simplified and the manufacturing costs can be reduced.

Further, according to the method of a separator for a fuel cell of the present embodiment, the scaly natural graphite powder, i.e., the carbon powder, is used as the raw material, the amount of the binder can be reduced as compared with a case of using many kinds of carbon powder. That is, each particle constituting the scaly natural graphite powder that a thin piece, the scaly natural graphite powder itself exhibits the adhering force. Therefore the amount of the binder added for giving an adhering force to the carbon powder constituting the separator can be reduced. If the powder having average particle size ranging from 5 to 50 μm and particle size distribution ranging from 1 to 200 μm is used as the carbon powder, the necessary amount of the binder can be reduced compared to the case where the carbon powder having finer particles is used. Since the thermosetting resin used as the binfer has no conductivity, only a small amount of the binder is required to be added to the raw material. As a result, conductivity of the manufactured separator can be improved. The aforementioned range of the particle constituting the carbon powder is selected such that the carbon powder and the binder can be uniformly mixed.

Figure 7:
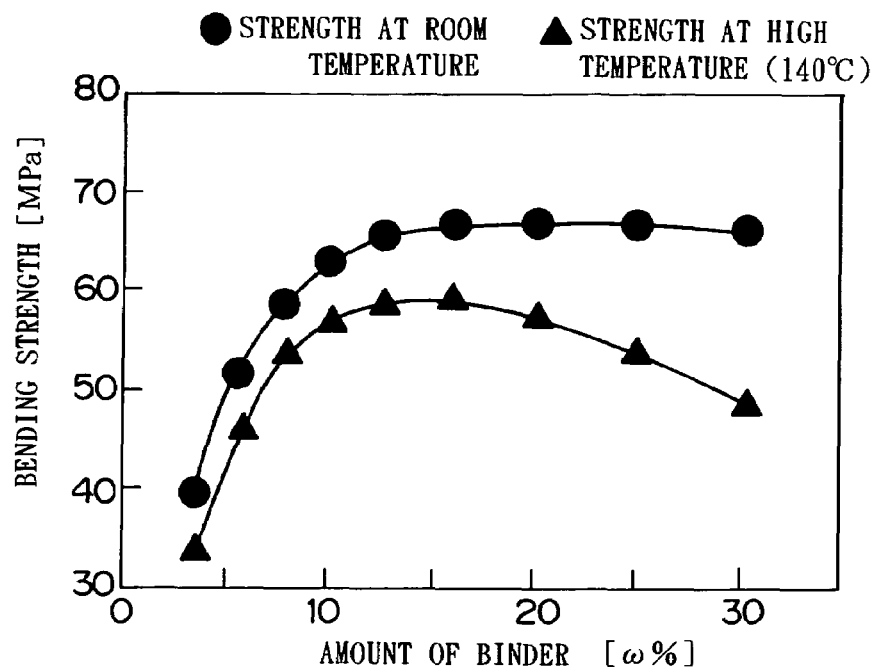
FIG. 7 is a view showing a relation between an amount of binder added to the raw material and a strength of a separator to be manufactured.

Further, strength of the manufactured separator can be enhanced by suppressing the amount of the binder added to the raw material. FIG. 7 is a view showing the relation between the binder amount added to the raw material and strength of the separator to be manufactured. At a room temperature, the strength of the separator is enhanced as the amount of the binder increases. If the amount of the binder to be added exceeds approximately 10% of the amount of the carbon powder, the strength becomes maximum and stable. Meanwhile at 140, as the binder amount increases, the strength of the separator increases as in the condition at a room temperature until the strength reaches the maximum value. However, if the binder amount to be added exceeds about 15% of the amount of the carbon powder, the strength of the separator is lowered as the binder amount increases. If the scaly natural graphite powder is used as the carbon powder, and the binder amount is reduced to about 12% of the carbon powder amount, the strength of the separator at the higher temperatures can be enhanced. The operating temperature of the solid polymer type fuel cell is higher than the room temperature (e.g., 80 to 100), and if the strength of the separator at higher temperatures is enhanced, durability of the fuel cell can be improved. The upper limit of heat-resistant temperature of the solid polymer membrane constituting the solid polymer type fuel cell is about 140, the strength of the separator can be sufficiently secured within the heat-resistant temperature range of the solid polymer membrane by reducing the binder amount as aforementioned.

Figure 8:
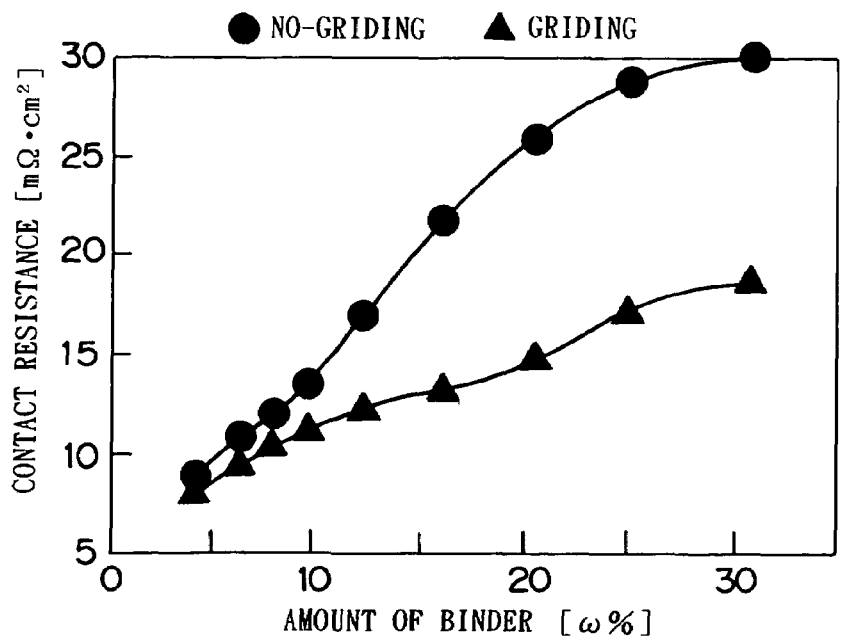
FIG. 8 is a view showing a relation between the amount of the binder added to the raw material and a contact resistance of the separator to be manufactured.

Further, according to the method of a separator for a fuel cell of the present embodiment, the projecting portion of the rugged structure formed on a surface of the separator member obtained by the heat-press forming is subjected to grinding to eliminate the binder layer formed on the surface of the separator for manufacturing the separator 30. The resultant separator exhibits sufficiently high conductivity. FIG. 8 is a view explaining a relation between an amount of the binder added to the raw material powder and a contact resistance of the manufactured separator in each of cases where the grinding is conducted and the grinding is not conducted for eliminating the binder layer formed on the surface of the separator member. The thermosetting resin to be added as the binder exhibits no conductivity. As the binder amount increases, the amount of the binder blurred to the surface of the separator member during the heat-press forming increases. Accordingly the thickness of the binder layer formed on the separator member surface increases as the binder amount increases. Therefore the contact resistance of the separator increases as the increase in the added amount of the binder. Meanwhile conducting the grinding process may eliminate the binder layer, thus securing sufficient conductivity of the separator. Therefore the contact resistance of the separator increases to extremely a lower degree in spite of increase in the amount of the binder to be added (see FIG. 8).

The separator member obtained by the heat press forming is subjected to grinding to eliminate not only the binder layer on the separator member surface, but also the mold-separating agent adhered onto the separator member surface as aforementioned. The mold-separating agent exhibits no conductivity but water repellency. Therefore grinding the separator member surface may improve the conductivity and prevent the separator surface from exhibiting undesirable water repellency. Water repellency of the separator may adversely affect the water drainage in the gas passage of the fuel cell assembled using the aforementioned separator. As a result, the drainage of the fuel cell might be deteriorated owing to undesirable water repellency of the separator. In such a case, the aforementioned drawback can be solved by grinding the separator member surface.

The embodiment of the present invention has been described above, the present invention should not be limited by the embodiment, and it is of course possible to carry out the present invention in various modes in a scope without departing from the subject of the present invention.

What is claimed is:

1. A method of manufacturing a separator for a fuel cell comprising:
   preparing a raw material by mixing a carbon, an epoxy resin and a phenolic resin, wherein said phenolic resin is different from said epoxy resin;
   charging the raw material into a predetermined mold; and
   heat press forming the raw material charged into the mold, wherein the epoxy resin comprises a glycidylamine epoxy resin.

2. A method of manufacturing a separator for a fuel cell comprising:
   preparing a raw material by mixing a carbon, an epoxy resin and a phenolic resin, wherein said phenolic resin is different from said epoxy resin;
   charging the raw material into a predetermined mold; and
   heat press forming the raw material charged into the mold;
   wherein the step of preparing the raw material includes the substeps of:
      forming the raw material into a slurry; and
      preparing a powder having an average particle size ranging from 50 to 150 μm and a particle size distribution ranging from 50 to 300 μm by spraying and drying the slurry for granulation.

* * * * *

UNITED STATES PATENT AND TRADEMARK OFFICE
CERTIFICATE OF CORRECTION

PATENT NO. : 7,172,830 B2
APPLICATION NO. : 09/232498
DATED : February 6, 2007
INVENTOR(S) : Seiji Mizuno It is certified that error appears in the above-identified patent and that said Letters Patent is hereby corrected as shown below:

Page 1, under U. S. Patent Documents, after "Pellegri" add --et al.--;

Page 1, under Other Publications, line 4, after "GB;" add --Class A-14--;

Fig. 7, change "[ù %]" to --[ùt %]--

Fig. 8, change "No-Griding" to --No Grinding--; change "[ù%]" to --[ùt %]--;

Column 2, Line 37, after "Further," delete "as";

Column 4, Line 9, after "energy" delete "from";

Column 4, lines 16-17, change "ther-ebetween" to --there-between--;

Column 9, line 20, change "examples. That" to --examples, that--;

Column 10, line 47, after "case," add --when a--;

Column 11, Line 10, change "that a thin piece" to --as a thin piece--;

Column 11, Line 20, change "binfer" to --binder--;

Column 11, Line 35, change "140" to --140°C.--;

Column 11, Line 50, change "140" to --140°C.--

Column 12, lines 11-12; change "as the increase in the added amount of the binder" to --as the added amount of the binder increases.--

UNITED STATES PATENT AND TRADEMARK OFFICE
CERTIFICATE OF CORRECTION

PATENT NO.        : 7,172,830 B2
APPLICATION NO.   : 09/232498
DATED             : February 6, 2007
INVENTOR(S)       : Seiji Mizuno It is certified that error appears in the above-identified patent and that said Letters Patent is hereby corrected as shown below:

Column 12, Line 23, after "but" add --exhibits--.

Signed and Sealed this

Fourth Day of September, 2007

JON W. DUDAS
*Director of the United States Patent and Trademark Office*